2 Sheets—Sheet 1.

G. MERCER.
Saw-Gummer.

No. 204,749.        Patented June 11, 1878.

ATTEST,
George H. Knight
Chas J. Gooch

INVENTOR,
George Mercer
By Knight Bros.
Attys.

N. PETERS, PHOTO-LITHOGRAPHER, WASHINGTON, D. C.

2 Sheets—Sheet 2.
G. MERCER.
Saw-Gummer.
No. 204,749. Patented June 11, 1878.
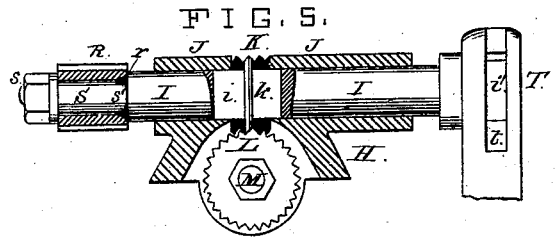
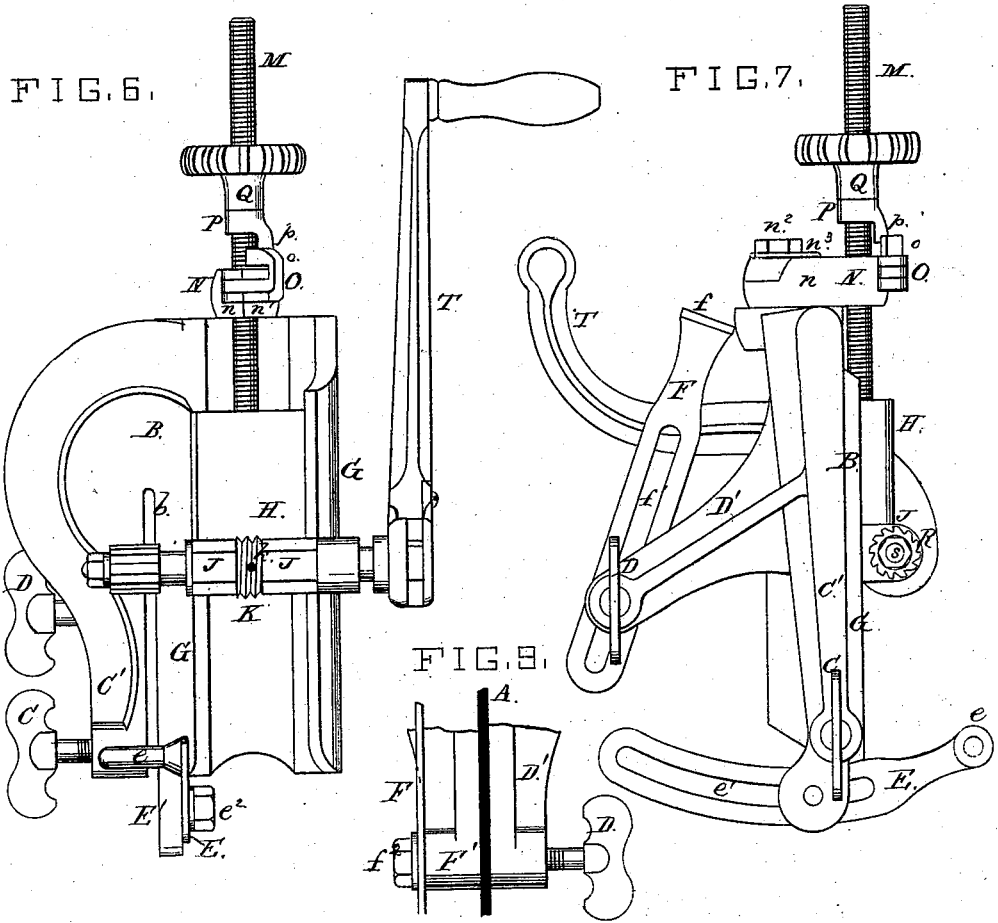
ATTEST.
Geo. H. Knight
Chas. J. Gooch
INVENTOR.
George Mercer
By Knight Bro.
Attys.

UNITED STATES PATENT OFFICE.

GEORGE MERCER, OF ST. LOUIS, MISSOURI, ASSIGNOR OF ONE-HALF HIS RIGHT TO JOSEPH W. BRANCH, OF SAME PLACE.

IMPROVEMENT IN SAW-GUMMERS.

Specification forming part of Letters Patent No. 204,749, dated June 11, 1878; application filed February 6, 1878.

*To all whom it may concern:*

Be it known that I, GEORGE MERCER, of the city of St. Louis and State of Missouri, have invented a certain new and useful Improvement in Saw-Gummers, of which the following is a full, clear, and exact description, reference being had to the accompanying drawings, forming part of this specification.

The first part of my invention consists in the combination of the countersunk cutter, spindle-shaft, worm, and worm-wheel with the feed-screw, its divided nut, and adjustable cam, as hereinafter described and claimed.

The second part of my improvement consists in providing the feed-screw with an adjustable cam that comes in contact at a given time with the catch holding the parts of the split nut together, and by opening the said catch allows the jaws of the nut to spring apart, so that the feed movement ceases, thus limiting the descent of the cutter to a uniform depth in the saw-plates.

The third part of my improvement consists in the combination, with the feed-screw, of a hand-nut screwing thereon, and held fixedly thereon by a jam-nut, so as to limit the depth to which the cutter enters the saw-plate.

Figure 1:
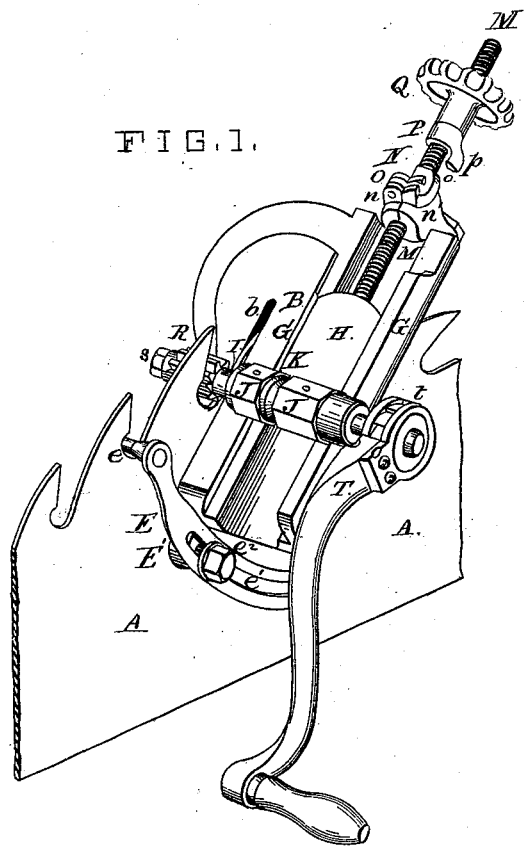
Figures 2, 3, 4:
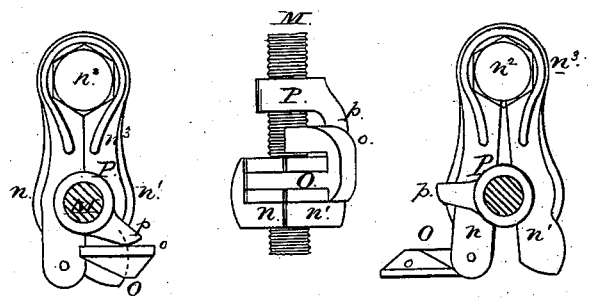

In the drawings, Figure 1 is a perspective view, showing the machine in operating position on a saw. Fig. 2 is a top view of the split nut of the feed-screw, with the screw in section, showing the nut closed upon the screw. Fig. 3 is a front view of the same. Fig. 4 is a top view of split nut, showing it open and disengaged from the screw. Fig. 5 is a section axial to the cutter-shaft, showing the screw-feed gear. Fig. 6 is a front view. Fig. 7 is a side view. Fig. 8 shows the ratchet-connection of the driving-crank. Fig. 9 is a detail back view, showing the rear clamp, with saw in section within the clamp.

A is a portion of a circular saw, to which the gummer is applied. Although it is equally applicable to a straight saw. The guide-plate B of the machine has a slot, $b$, to receive the edge of the saw. It is secured in position upon the saw by thumb-screws C D, screwing in arms C' D'.

The machine is set in proper position upon the saw by guides E and F. The guide E has a pin, $e$, which rests against the back edge of a tooth in front of the cutter, and the guide F has a lip or flange, $f$, resting against the point of one of the teeth at the back of the cutter. Thus it will be seen that the gummer is set to the proper inclination and position. The guides are slotted at $e^1$ and $f^1$, and are secured in position by bolts $e^2$ and $f^2$, which pass through the slots and screw into arms or projections E' and F'. It will be seen that the guides have capacity for adjustment to any position to suit any size or character of saw.

G G are guides, on which works the carriage H. I is the cutter-shaft, turning in bearings J upon the face of the carriage H. Between the bearings J room is left for the worm-wheel K, through which the shaft passes, and to which it is secured by a diametric pin, $k$, which passes through a longitudinal slot, $i$. The arrangement is such that the shaft has endwise movement through the worm-wheel, and the worm-wheel is compelled to turn with the shaft. The worm-wheel engages with a screw-gear wheel, L, upon the feed-screw M. The feed-screw M has bearing at the lower end in the carriage, and turns freely in the bearing, and the carriage is raised and lowered with the screw. The screw extends upward between the jaws $n$ $n^1$ of the open or split nut N, the jaws being connected by a hinge, $n^2$, and forced apart by a spring, $n^3$. O is a catch hinged to the jaw $n$, and fitted to engage the projecting end of the jaw $n^1$, so as to hold the jaws together. The catch has a tappet, $o$, which is engaged by a cam, $p$, to move out the free end of the catch and release the jaw $n^1$, when the jaws fly open under the action of the spring $n^3$, and the continued rotation of the feed-screw does not farther advance the carriage.

The cam $p$ is upon a nut, P, screwing upon the feed-screw, and held in position by the hand-nut Q, which acts as a jam-nut. R is the cutter, which fits on the spindle S, and is secured by a nut, $s$. The inner end of the cutter is countersunk at $r$, and fits a conical shoulder, $s'$, of the spindle, so that there is no rectangular shoulder, and consequently the spindle is not subject to be broken off transversely, as it otherwise would be.

The shaft or mandrel I of the cutter is turned by a hand-crank, T, which has pawl-and-ratchet connection $t$ $i'$ with the shaft, so that the forward rotation of the crank carries the shaft around with it; but on the backward rotation of the crank the spring-pawl $t$ slips over the ratchet, and no retrograde movement is imparted to the cutter-shaft. This is an important feature, because when a cutter is in contact with the saw backward rotation breaks the teeth.

The operation of the gummer is as follows: It is placed on the saw in the position shown, and the jaws of the split nut N are brought together upon the feed-screw and held by the catch O, so that the turning of the cutter-shaft will cause the downward movement of the cutter. The cam-nut P is fixed in such a position upon the feed-screw that when the cutter has cut far enough into the plate A the cam P $p$ comes in contact with the tappet $o$ of the catch to throw out the catch, and the cutter is not forced down any farther by the feed-screw. When it is desired to feed by hand, the pin-key $k$ is knocked out and the worm-wheel removed from the cutter-shaft.

I claim—

1. The combination of cutter R, whose inner end is countersunk at $r$, and fits conical shoulder $s'$ of spindle-shaft I, worm-gear K, surrounding the shaft and engaging with the screw-gear wheel L on the feed-screw M, spring-jaws $n$ $n^1$ $n^2$, forming split nut N, in which the screw turns to give motion to the carriage-cam P $p$, and catch O, substantially as set forth.

2. The combination, with the feed-screw M, of the adjustable cam P $p$, spring-jaws $n$ $n^1$ $n^2$, forming split nut N, and catch O, substantially as set forth.

3. The combination, with the feed-screw M and split feed-nut N, provided with catch O, of the cam-nut P and hand-nut Q, substantially as and for the purpose set forth.

GEORGE MERCER.

Witnesses:
SAML. KNIGHT,
C. W. H. BROWN.